US009096231B2

(12) United States Patent
Kamisetty et al.

(10) Patent No.: US 9,096,231 B2
(45) Date of Patent: Aug. 4, 2015

(54) ROLLBACK PREVENTION SYSTEM FOR MOBILE MACHINE

(75) Inventors: SriVidya Lavanya Kamisetty, Aurora, IL (US); Brian Douglas Hoff, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 23 days.

(21) Appl. No.: 13/431,616

(22) Filed: Mar. 27, 2012

(65) Prior Publication Data
US 2013/0261909 A1 Oct. 3, 2013

(51) Int. Cl.
| B60W 30/00 | (2006.01) |
| G06F 7/00 | (2006.01) |
| B60W 10/06 | (2006.01) |
| B60W 10/10 | (2012.01) |
| B60W 30/18 | (2012.01) |
| B60W 10/18 | (2012.01) |
| B60W 30/184 | (2012.01) |

(52) U.S. Cl.
CPC ......... *B60W 30/18118* (2013.01); *B60W 10/10* (2013.01); *B60W 10/18* (2013.01); *B60W 30/1846* (2013.01); *B60W 2300/17* (2013.01); *B60W 2710/105* (2013.01)

(58) Field of Classification Search
CPC ................ B60W 10/08; B60W 10/06; B60W 30/18118; B60W 10/18; B60W 30/1846; B60W 2300/13; B60W 2710/105
USPC .......................................................... 701/22
See application file for complete search history.

(56) References Cited

U.S. PATENT DOCUMENTS

| 5,484,044 A | 1/1996 | Bursteinas et al. |
| 6,056,373 A | 5/2000 | Zechmann et al. |
| 6,814,414 B1 | 11/2004 | Schmitt et al. |
| 6,829,528 B1 * | 12/2004 | Kang et al. ...................... 701/51 |
| 7,401,873 B2 | 7/2008 | Werner |
| 7,530,913 B2 | 5/2009 | Fabry et al. |
| 7,530,914 B2 | 5/2009 | Fabry et al. |

(Continued)

FOREIGN PATENT DOCUMENTS

| CN | 101169179 | 4/2008 |
| JP | 2006183780 | 7/2006 |

OTHER PUBLICATIONS

U.S. Patent Application of SriVidya Lavanya Kamisetty et al., entitled "Rollback Prevention System for Mobile Machine" filed on Mar. 27, 2012.

*Primary Examiner* — Redhwan K Mawari
*Assistant Examiner* — Rodney P King
(74) *Attorney, Agent, or Firm* — Finnegan, Henderson, Farabow, Garrett & Dunner, LLP

(57) ABSTRACT

A rollback prevention system is disclosed for use with a mobile machine having an engine and a transmission. The rollback prevention system may have an input device configured to receive an input indicative of a desired travel direction of the mobile machine, a sensor configured to generate a signal indicative of an actual travel direction of the mobile machine, and a controller in communication with the input device, the sensor, the engine, and the transmission. The controller may be configured to make a determination that the actual travel direction of the mobile machine is opposite the desired travel direction based on the signal, and determine a load on the transmission. The controller may also be configured to selectively increase a torque output of the transmission based on the determination only when the load on the transmission is less than a threshold value.

16 Claims, 4 Drawing Sheets

(56) References Cited

U.S. PATENT DOCUMENTS

| | | |
|---|---|---|
| 7,542,837 B2 | 6/2009 | Messner et al. |
| 7,711,469 B2 | 5/2010 | Sokoll et al. |
| 7,743,860 B2 | 6/2010 | Soliman et al. |
| 7,744,166 B2 | 6/2010 | Leiter et al. |
| 7,854,861 B2 | 12/2010 | Li et al. |
| 7,988,593 B2 | 8/2011 | Staub et al. |
| 2003/0191574 A1* | 10/2003 | Kawai et al. .................... 701/70 |
| 2003/0227215 A1 | 12/2003 | Kinder et al. |
| 2007/0007099 A1 | 1/2007 | Gierling et al. |
| 2009/0127012 A1 | 5/2009 | Leibbrandt et al. |
| 2009/0288903 A1* | 11/2009 | Musmaker et al. ........... 180/336 |
| 2011/0046829 A1* | 2/2011 | Tamai et al. .................... 701/22 |
| 2011/0166752 A1* | 7/2011 | Dix et al. ........................ 701/50 |

* cited by examiner

ROLLBACK PREVENTION SYSTEM FOR MOBILE MACHINE

TECHNICAL FIELD

The present disclosure is directed to a rollback prevention system and, more particularly, to a rollback prevention system for a mobile machine.

BACKGROUND

Mobile machines such as wheel loaders, dozers, off-highway trucks, and other heavy equipment are used to perform many tasks. To effectively perform these tasks, the machines require an engine that provides significant torque through a transmission to one or more ground engaging devices. The transmission can include, for example, a mechanical power-shift transmission, a hydrostatic transmission, an electric transmission, or a hybrid transmission (e.g., a parallel path transmission that includes a combination of technologies).

During operation of a mobile machine, it may be possible for the machine to move in a direction opposite of a desired direction that has been selected by an operator of the machine. For example, the operator may select between a forward traveling direction and a reverse traveling direction. And in some situations, even though the operator has selected the forward traveling direction, it may be possible for the mobile machine to move in the reverse traveling direction. In particular, when the mobile machine is operating on a hill and the operator has requested an insufficient amount of forward torque from the transmission, it may be possible for gravity to cause the mobile machine to overcome the requested torque and roll backwards down the hill. Uncontrolled rollback of a mobile machine may be unwanted in some applications.

One attempt to prevent uncontrolled rollback of a mobile machine is described in U.S. Patent Publication No. 2009/0127012 of Leibbrandt et al. that published on May 21, 2009 (the '012 publication). In particular, the '012 publication describes a method of machine control. The method includes detecting movement of the mobile machine in a direction opposite a desired direction of movement after release of brakes, and gradually increasing torque from an automatic transmission against the rollback direction based on the detection. The amount of torque exerted by the automatic transmission against the rollback direction does not exceed a defined maximum value, such that rollback acceleration is decreased to zero or to a positive forward creep speed.

Although the method of the '012 publication may help prevent rollback of a mobile machine, the method may be less than optimal. In particular, there may be times when machine rollback is desired and/or unavoidable. Attempting to prevent rollback in these situations may be counterproductive.

The rollback prevention system of the present disclosure solves one or more of the problems set forth above and/or other problems of the prior art.

SUMMARY

One aspect of the present disclosure is directed to a rollback prevention system for a mobile machine having an engine and a transmission. The rollback prevention system may include an input device configured to receive an input indicative of a desired travel direction of the mobile machine, a sensor configured to generate a signal indicative of an actual travel direction of the mobile machine, and a controller in communication with the input device, the sensor, the engine, and the transmission. The controller may be configured to make a determination that the actual travel direction of the mobile machine is opposite the desired travel direction based on the signal, and determine a load on the transmission. The controller may also be configured to selectively increase a torque output of the transmission based on the determination only when the load on the transmission is less than a threshold value.

Another aspect of the present disclosure is directed to a method of preventing rollback of a mobile machine having an engine and a transmission. The method may include receiving an input indicative of a desired travel direction of the mobile machine, detecting an actual travel direction of the mobile machine, and making a determination that the actual travel direction is opposite the desired travel direction. The method may also include determining a transmission load of the mobile machine and, based on the determination, selectively increasing a transmission torque output of the mobile machine only when the transmission load is less than a threshold value.

DETAILED DESCRIPTION

Figure 1:
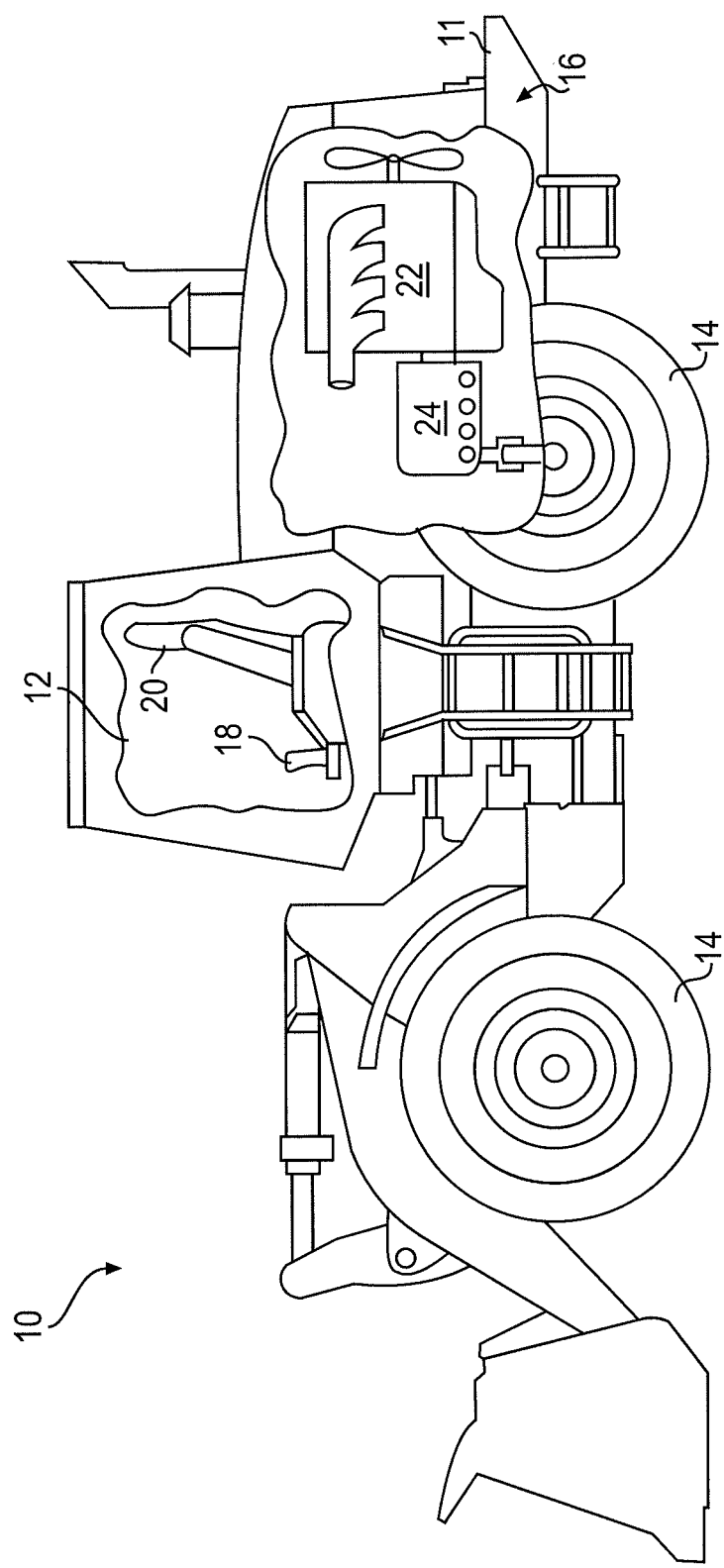
FIG. 1 is a diagrammatic illustration of an exemplary disclosed machine.

FIG. 1 illustrates an exemplary machine 10 having multiple systems and components that cooperate to accomplish a task. The tasks performed by machine 10 may be associated with a particular industry such as mining, construction, farming, transportation, power generation, or another industry known in the art. For example, machine 10 may embody a mobile machine such as the wheel loader depicted in FIG. 1, an on- or off-highway haul truck, or another type of mobile machine known in the art. Machine 10 may include a frame 11, an operator station 12 supported by frame 11, one or more traction devices 14 rotatably connected to frame 11, and a powertrain 16 supported by frame 11 and operatively connected to drive at least one of traction devices 14 in response to input received from operator station 12.

Figure 2:
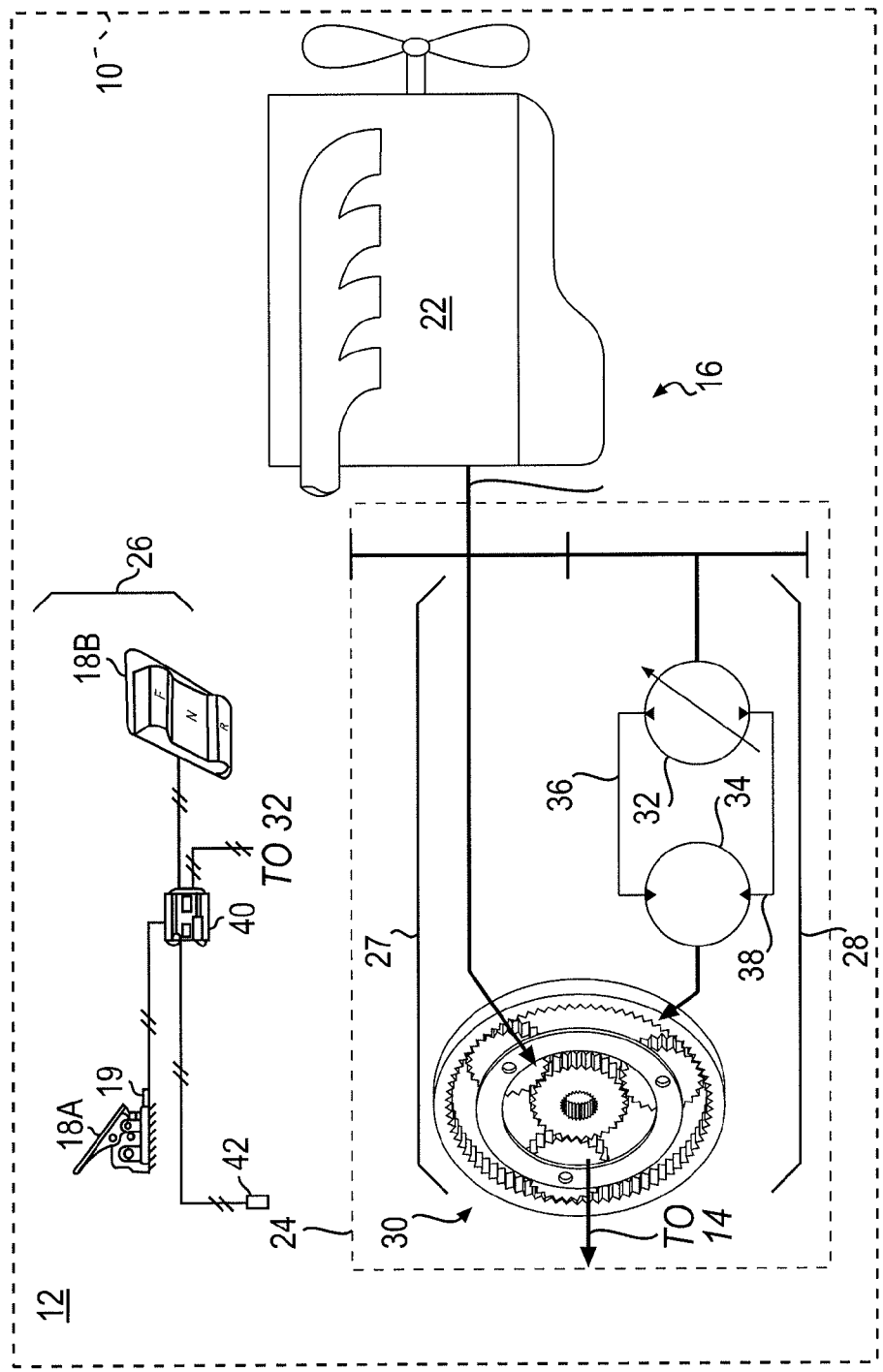
FIG. 2 is a pictorial illustration of an exemplary disclosed rollback prevention system that may be used in conjunction with the machine of FIG. 1.

Operator station 12 may embody a generally enclosed cabin having devices that receive manual signals indicative of desired machine maneuvering. Specifically, operator station 12 may include one or more interface devices 18 located proximate an operator seat 20. Interface devices 18 may initiate movement and/or activate features of machine 10 by producing signals that are indicative of a desired machine function. As shown in the exemplary embodiment of FIG. 2, interface devices 18 may include one or more foot pedals 18a and a gear selector 18b. As an operator manipulates foot pedal(s) 18a (i.e., displaces foot pedal(s) 18a away from a neutral position), the operator may expect and affect a corresponding machine travel function (e.g., braking). As the operator manipulates gear selector 18b, the operator may be selecting a travel direction (e.g., reverse, neutral, or forward) and/or a desired travel speed, limit, or range in a particular direction. It is contemplated that interface devices other than foot pedals and gear selectors such as, for example, joysticks, levers, switches, knobs, wheels, and other devices known in the art may additionally or alternatively be provided within operator station 12 for travel control of machine 10, if desired.

A sensor 19, such as a switch or potentiometer, may be provided in association with foot pedal 18a to sense the displacement position thereof and produce a corresponding signal responsive to the displaced position. The displacement signal from sensor 19, as will be described in more detail below, may be used to control operations of powertrain 16.

Traction devices 14 (referring to FIG. 1) may embody wheels located at each side of machine 10 (only one side shown). Alternatively, traction devices 14 may include tracks, belts or other known traction devices. It is contemplated that any combination of the wheels on machine 10 may be driven and/or steered. Although not shown, a brake could be associated with one or more of traction devices 14 and selectively activated via foot pedal(s) 18a to retard the motion of traction devices 14, if desired. It is also contemplated that traction devices 14 may be braked through selective powertrain operation (e.g., resistive torque application) based on the signals from foot pedal(s) 18a in addition to or instead of through direct braking, if desired.

Powertrain 16 may be an integral package configured to generate and transmit power to traction devices 14 in response to signals received from interface devices 18. In particular, powertrain 16 may include an engine 22 operable to generate a power output, a transmission 24 connected to receive the power output and transmit the power output in a useful manner to traction devices 14 (referring to FIG. 1), and a control system 26 configured to regulate the operation of engine 22 and transmission 24 in response to one or more signals generated by foot pedal(s) 18a, gear selector 18b, and/or one or more different sensors.

Engine 22 may be an internal combustion engine having multiple subsystems that cooperate to produce a mechanical and/or electrical power output. For the purposes of this disclosure, engine 22 is depicted and described as a four-stroke diesel engine. One skilled in the art will recognize, however, that engine 22 may be any other type of internal combustion engine such as, for example, a gasoline or a gaseous fuel-powered engine. The subsystems included within engine 22 may include, for example, a fuel system, an air induction system, an exhaust system, a lubrication system, a cooling system, and other appropriate systems.

In the disclosed embodiment, transmission 24 may be a hybrid transmission having multiple flow paths to transmit power from engine 22 to traction devices 14. In particular, transmission 24 may include a first power path 27 extending through a multi-speed, bidirectional, mechanical transmission, and a second power path 28 extending through a hydraulic (or alternatively electric) continuously variable transmission (CVT). First and second power paths 27, 28 may be arranged in series or parallel, originate from a common mechanical output of engine 22, and have a common termination through one or more final gear assemblies 30 (only one shown in FIG. 2). Multiple fluid activated clutches (not shown) may also be included within transmission 24, if desired. These clutches may selectively fill with pressurized fluid causing engagement of portions of final gear assembly 30. The combination of engaged clutches may determine stepped output speed ratios of transmission 24.

The CVT portion or second power path 28 within transmission 24 may include a pump 32 and a motor 34 interconnected by way of a first fluid passage 36 and a second fluid passage 38. Pump 32 may be, for example, a variable displacement pump that is mechanically rotated by engine 22 to pressurize fluid. The pressurized fluid may be directed through motor 34 by way of fluid passages 36 or 38, depending on the travel direction of machine 10. Motor 34, being driven by the pressurized fluid, may rotate a portion of final gear assembly 30. The direction and speed of this rotation may affect the output ratio of transmission 24. A controller 40 may manipulate the displacement of pump 32 with a pump command signal to thereby control the rotation of motor 34 and the resulting output torque and speed of transmission 24. It is contemplated that motor 34 may also be a variable displacement device, if desired, and also be regulated way of command signals from controller 40. It is to be noted that in an electric CVT configuration, a generator and electric motor may substitute for the fluid pump and motor described above.

A sensor 42 may be associated with transmission 24 and/or traction device 14 (referring to FIG. 1) to sense an actual travel speed and direction of machine 10. In one example, sensor 42 may embody a magnetic pickup type of rotary sensor associated with a magnet embedded within a rotational component of powertrain 16 such as a transmission output shaft. During operation of machine 10, sensor 42 may sense the rotating field produced by the magnet and generate a signal corresponding to the corresponding actual travel speed and direction of machine 10.

Controller 40, together with interface devices 18, sensors 19 and 42, and displacement control mechanisms of transmission 24, may constitute control system 26. Controller 40 may embody a single microprocessor or multiple microprocessors that include a means for controlling the operation of powertrain 16 in response to the received signals. Numerous commercially available microprocessors can be configured to perform the functions of controller 40. It should be appreciated that controller 40 could readily embody a general machine microprocessor capable of controlling numerous machine functions. Controller 40 may include a memory, a secondary storage device, a processor, and any other components for running an application. Various other circuits may be associated with controller 40 such as power supply circuitry, signal conditioning circuitry, solenoid driver circuitry, and other types of circuitry.

One or more powertrain control maps relating the displacement position of pedal(s) 18a, the status of gear selector 18b, the actual travel speed and direction of machine 10, the load on engine 22, and/or other control variables may be stored within the memory of controller 40. Each of these maps may be in the form of tables, graphs, and/or equations and include a compilation of data collected from lab and/or field operation of powertrain 16. Controller 40 may reference these maps and control transmission 24 to bring the operation of powertrain 16 in line with expected and/or desired performance of machine 10.

Figure 3:
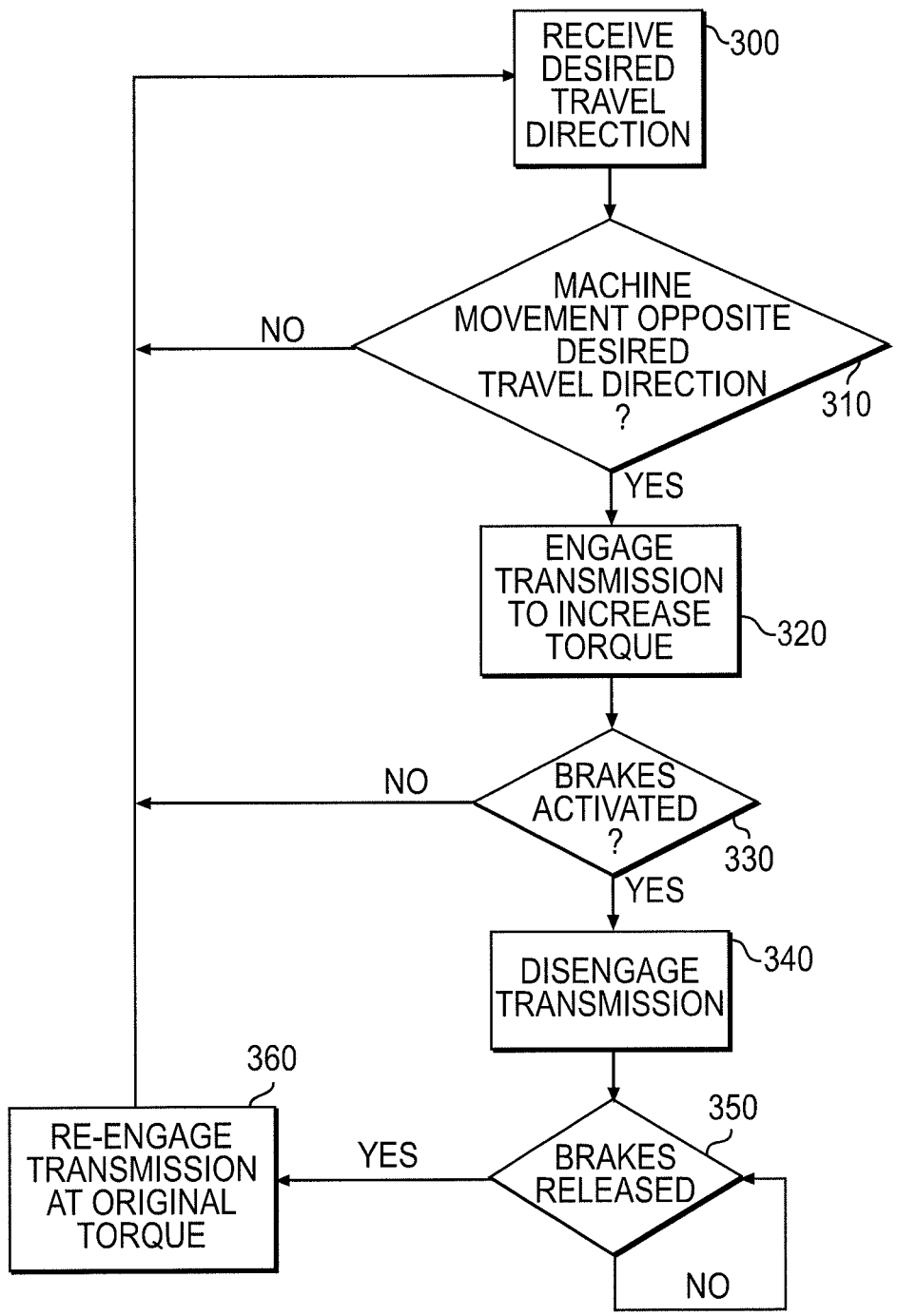
FIG. 3 is a flowchart depicting an exemplary disclosed operation that may be performed by the rollback prevention system of FIG. 2.
Figure 4:
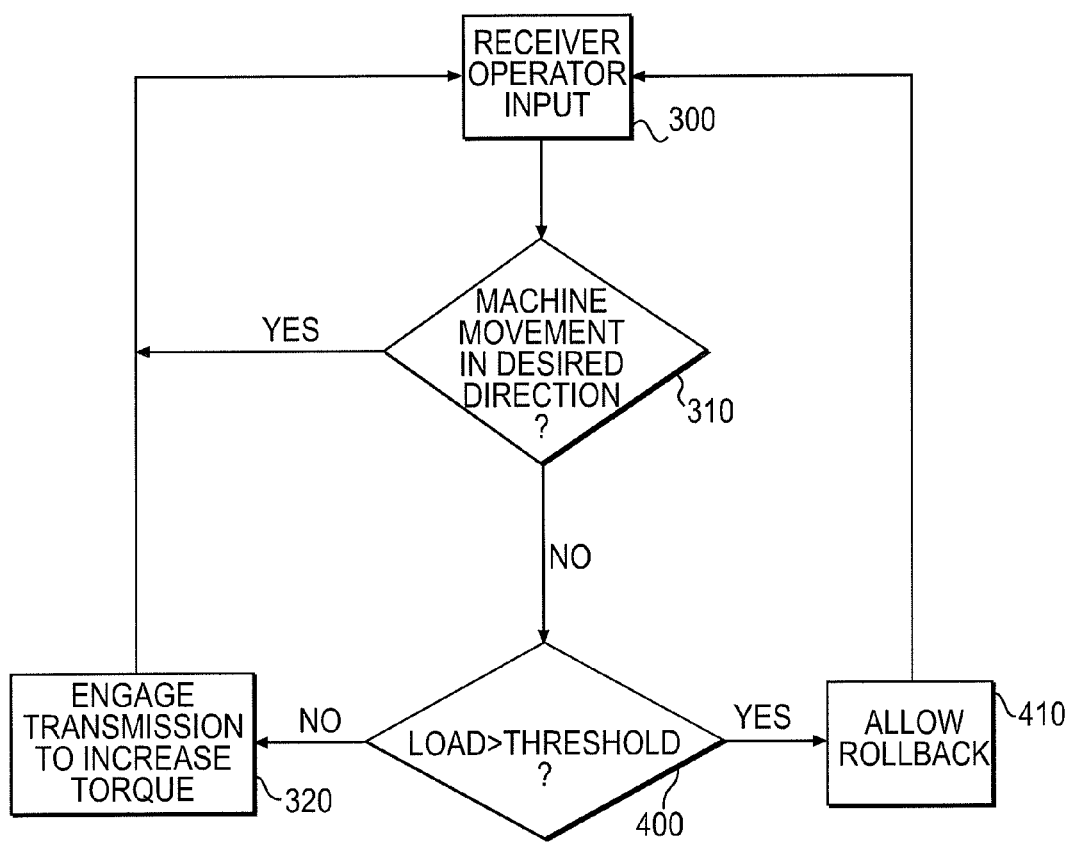
FIG. 4 is a flowchart depicting another exemplary disclosed operation that may be performed by the rollback prevention system of FIG. 2.

FIGS. 3 and 4 depict exemplary methods of operating control system 26 that are regulated by controller 40. FIGS. 3 and 4 will be discussed in more detail in the following section to further clarify aspects of the disclosed system.

INDUSTRIAL APPLICABILITY

The disclosed control system may be used to prevent rollback of a mobile machine in a responsive manner and only when desired. The disclosed control system may prevent rollback by detecting machine travel in a direction opposite a desired direction and responsively controlling an associated transmission to increase resistive torque output. The disclosed control system may prevent rollback when rollback is undesired, by taking into account an operator-regulated load on the mobile machine. The disclosed control system may be responsive by adjusting rollback prevention based on operator-instituted braking. Operation of control system 26 will now be described in detail with reference to FIGS. 3 and 4.

As illustrated in the flowchart of FIG. 3, the first step in preventing undesired rollback of machine 10 may include controller 40 receiving an indication from an operator of machine 10 regarding a desired travel direction (Step 300). This indication may be provided by way of a signal generated by gear selector 18b. For example, the operator may select a forward travel direction as the desired travel direction of machine 10 by manipulating gear selector 18b in a corresponding manner. In response to this manipulation, gear selector 18b may generate a signal indicative of the desired travel direction and direct this signal to controller 40.

Based on the signal from gear selector 18b and based on the actual travel direction of machine 10 (as continuously provided by sensor 42), controller 40 may determine if machine 10 is currently moving in a direction opposite of the desired travel direction (e.g., if machine 10 is moving in a reverse travel direction) (Step 310). As long as controller 40 determines that machine 10 is either not moving or moving in the same direction as desired by the operator, control may return to step 300 without preventative action being taken by controller 40.

However, when controller 40 determines at step 310 that machine 10 is traveling in a direction opposite to the desired travel direction (Step 310: Yes), controller 40 may engage transmission 24 to increase its torque output and resist the current travel of machine 10 (Step 320). In one embodiment, machine 10 may first be required to travel in the opposing direction at a speed greater than a threshold value (e.g., greater than about 0.1 kph) before controller 40 may engage transmission 24 to increase its torque output. Controller 40 may cause transmission 24 to increase its resistive torque output by, for example, increasing the displacement, output flow rate, and/or output pressure of pump 32 (and motor 34, if desired), thereby resulting in a greater torque being applied by motor 34 through gear assembly 30 to traction devices 14 in the desired direction.

The amount of torque applied by transmission 24 to traction devices 14 to prevent rollback of machine 10 may, in one example, be related to the travel speed of machine 10. For example, the torque applied by transmission 24 resisting the motion of traction devices 14 may increase for greater speeds of machine 10 in the direction opposite of what is desired by the operator. And as the travel speed of machine 10 reduces as a result of the increased torque resisting its motion, the torque output may likewise reduce, until eventually machine 10 is brought below a desired threshold value (e.g., below about 0.1 kph), to a complete stop, or even to a positive speed in the desired travel direction. Once the travel direction of machine 10 is no longer opposite the desired travel direction, controller 40 may release its control over transmission 24 under the rollback prevention strategy. It is contemplated that controller 40 may continue to cause transmission 24 to apply torque to traction devices 14 under an alternative drive strategy, after preventing rollback of machine 10, if desired.

During rollback prevention of machine 10, controller 40 may continuously monitor manual input from the operator. For example, controller 40 may determine if the operator has actuated braking of machine 10 (e.g., via foot pedal 18a) (Step 330), and adjust regulation of transmission 24 accordingly. That is, as long as braking is not activated by the operator during rollback prevention, control may continue normally as outlined above. However, when the operator activates braking during rollback prevention by controller 40, controller 40 may responsively disengage transmission 24 (i.e., cause transmission 24 to reduce the resistive torque applied to traction devices 14 to about zero) (Step 340). In particular, braking control of traction device 14 may trump rollback prevention control via transmission 24, allowing the operator alone to manually stop the rollback of machine 10. It is contemplated, however, that in some embodiments, rather than a complete disengagement of transmission 24 based on any manipulation of foot pedal 18a, controller 40 could alternatively be configured to gradually reduce the application of resistive torque by transmission 24 by an increasing amount as the operator displaces foot pedal 18a by an increasing amount or to only disengage transmission 24 after foot pedal 18a has been displaced by a minimum amount. In this manner, controller 40 may allow both transmission and braking forces to simultaneously prevent rollback of machine 10, if desired.

After disengaging transmission 24, controller 40 may still continue to monitor manual braking. That is, controller 40 may determine when the operator releases the machine brakes (Step 350), and respond accordingly. As long as the operator maintains braking activation (i.e., as long as the operator maintains displacement of foot pedal 18a), control may cycle through step 350. However, when the operator releases the brakes (Step: 350: Yes), controller 40 may be configured to immediately re-engage transmission 24 at the original torque output level that existed prior to braking of traction devices 14 (Step 360). That is, controller 40 may not be required to detect undesired movement of machine 10 after the operator releases foot pedal 18a before causing transmission 24 to apply resistive torque. In this manner, machine 10 should not move significantly from the location at which the operator originally stopped machine 10 from rolling back, even after the operator stops manually braking the motion of machine 10. In some applications, it is contemplated that controller 40 could alternatively gradually ramp up resistive torque application by transmission 24 as the operator releases foot pedal 18a (i.e., up to the original amount), if desired. Control may then return from step 360 to step 300.

As illustrated in the flowchart of FIG. 4, controller 40 may consider a load on machine 10 (e.g., a load on transmission 24) during rollback prevention, in some applications. In particular, there may be times when rollback is either unavoidable and/or acceptable to the operator, and attempting to prevent rollback in these situations could be ineffective, inefficient, and/or even damaging to machine 10. These situations may exist, for example, when machine 10 drives into a pile of material and attempts to load a tool of the machine with the material. In this situation, the material may exert a force on machine 10 that propels machine 10 in a direction opposite the desired travel direction selected by the operator. Accordingly, at any time after completion of steps 300 and 310 (described above), controller 40 may compare a load on transmission 24 with a threshold value (Step 400).

The load on transmission 24 could be determined in any number of different ways. For example, foot pedal 18a (the same or another foot pedal used to brake machine 10) could be used to designate a desired transmission torque output and controller 40 could relate the displacement position of foot pedal 18a to the loading of transmission 24. In another example, controller 40 could directly monitor the torque output of transmission 24 via a sensor (not shown) that detects a pressure (or current) at motor 34. In one embodiment, the threshold value may correspond with about 50% of a maximum transmission torque output of transmission 24.

When the load on transmission 24 is less than the threshold value (Step 400: No), control may return to step 320 from the flowchart of FIG. 3, wherein controller 40 increases transmission torque output to stop undesired travel of machine 10. However, when the load on transmission 24 is greater than the threshold value (Step 400: Yes), controller 40 may instead allow machine 10 to rollback (i.e., to move in a direction opposite the direction desired by the operator, as indicated via gear selector 18b) (Step 410), and control may return to step 300.

Because the disclosed control system may prevent rollback when rollback is undesired, greater performance and efficiency of machine 10 may be realized. In addition, by adjusting rollback prevention based on operator-instituted braking, greater control over machine 10 may be provided to the operator.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. A rollback prevention system for a mobile machine having an engine and a transmission, the rollback prevention system comprising:
    an input device configured to receive an input indicative of a desired travel direction of the mobile machine;
    a sensor configured to generate a signal indicative of an actual travel direction of the mobile machine; and
    a controller in communication with the input device, the sensor, the engine, and the transmission, the controller being configured to:
        make a determination that the actual travel direction of the mobile machine is opposite the desired travel direction based on the input and the signal;
        determine a load on the transmission based on a sensed pressure;
        monitor manual braking input from an operator of the mobile machine; and
        selectively control a torque output of the transmission based on the determination and based on whether a manual braking input from the operator is detected, and control the torque output of the transmission after an operator manual braking input is no longer detected to a same level of torque output as existed before the operator manual braking input was detected.

2. The rollback prevention system of claim 1, wherein: the controller is configured to increase the torque output of the transmission only when a manual braking input from the operator is not detected.

3. The rollback prevention system of claim 1, wherein the controller is configured to detect manual braking input from an operator in the form of activation of a foot brake pedal by the operator.

4. The rollback prevention system of claim 1, wherein the controller is configured to gradually reduce the torque output of the transmission by an increasing amount as an increasing amount of manual braking input from the operator is detected.

5. The rollback prevention system of claim 1, wherein the sensor is a rotary sensor associated with a rotating drivetrain component of the mobile machine.

6. The rollback prevention system of claim 1, wherein the input device is gear selector.

7. The rollback prevention system of claim 1, wherein:
    the transmission includes a motor; and
    the controller is configured to increase the torque output of the transmission by increasing a torque output of the motor.

8. The rollback prevention system of claim 7, wherein the motor is hydraulically driven.

9. The rollback prevention system of claim 7, wherein:
    the transmission is a hybrid parallel path transmission including a gear train driven by the engine; and
    the motor is configured to adjust an output ratio of the gear train.

10. A method of preventing rollback of a mobile machine, comprising:
    receiving an input indicative of a desired travel direction of the mobile machine;
    detecting an actual travel direction of the mobile machine;
    making a determination that the actual travel direction is opposite the desired travel direction;
    determining a transmission load of the mobile machine by determining a pressure of the transmission;
    monitoring manual braking input from an operator of the mobile machine; and
    selectively controlling a transmission torque output of the mobile machine based on the determination and based on whether a manual braking input from the operator is detected, and controlling the torque output of the transmission after an operator manual braking input is no longer detected to a same level of torque output as existed before the operator manual braking input was detected.

11. The method of claim 10, further including increasing the torque output of the transmission only when a manual braking input from the operator is not detected.

12. The method of claim 10, wherein monitoring manual braking input from an operator comprises monitoring activation of a foot brake pedal by the operator.

13. The method of claim 10, wherein controlling a transmission torque output of the mobile machine comprises gradually reducing the torque output of the transmission by an increasing amount as an increasing amount of manual braking input from the operator is detected.

14. The method of claim 10, wherein increasing the transmission torque output includes increasing an output torque of a hydraulic motor.

15. The method of claim 14, wherein increasing the output torque of the hydraulic motor adjusts an output ratio of a mechanical gear train.

16. A mobile machine, comprising:
    an engine;
    a traction device;
    a hybrid parallel path transmission having a mechanical gear train and a hydraulic motor configured to adjust an output ratio of the mechanical gear train;
    gear selector configured to receive input from an operator indicative of a desired travel direction of the mobile machine;
    a sensor configured to generate a signal indicative of an actual travel direction of the mobile machine; and
    a controller in communication with the engine, the hybrid parallel path transmission, the gear selector, and the sensor, the controller being configured to:
        make a determination that the actual travel direction of the mobile machine is opposite the desired travel direction based on the signal;
        determine a load on the hybrid parallel path transmission based on a sensed pressure;

monitor manual braking input from an operator of the mobile machine; and selectively control a torque output of the hydraulic motor based on the determination and based on whether a manual braking input from the operator is detected, and control the torque output of the transmission after an operator manual braking input is no longer detected to a same level of torque output as existed before the operator manual braking input was detected.

* * * * *